J. J. & O. C. SCHUPP & O. H. WISLER.
DETACHABLE EMERGENCY TRACTION SHOE FOR AUTOMOBILES.
APPLICATION FILED NOV. 23, 1915.
1,295,802. Patented Feb. 25, 1919.
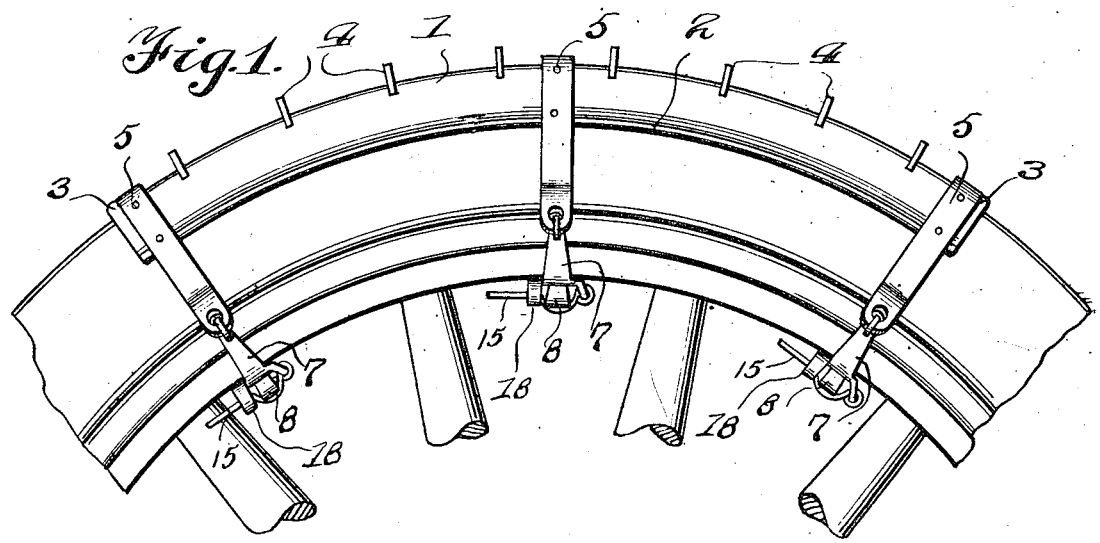
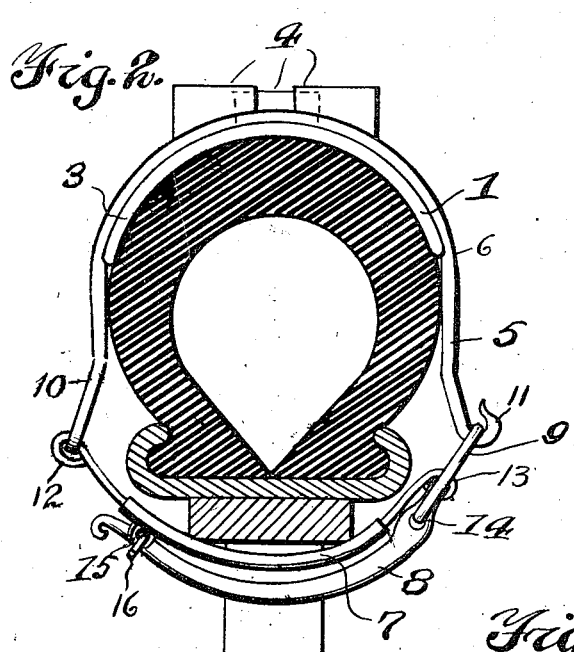
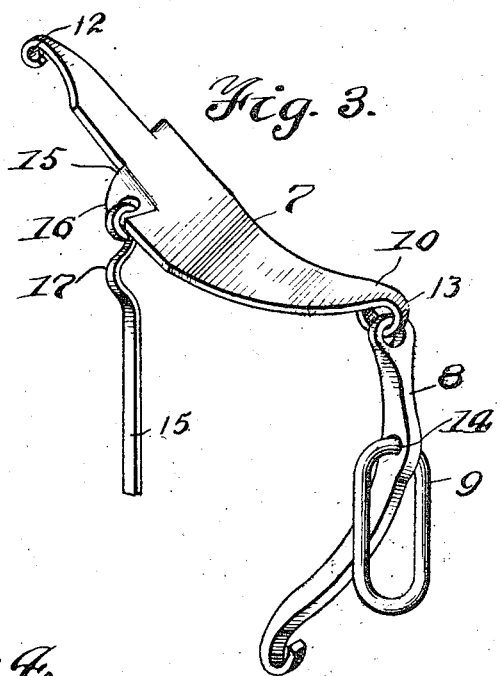
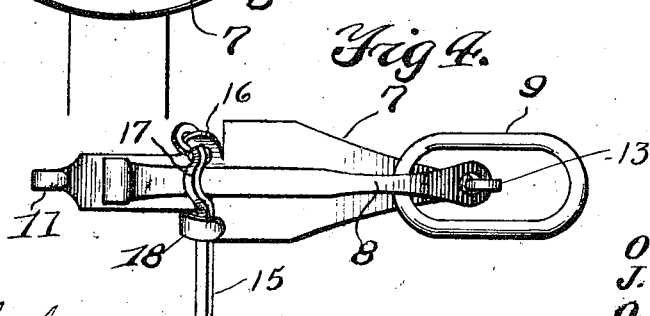
Inventors
Otto C. Schupp
J. J. Schupp &
O. H. Wisler.
By Victor J. Evans
Attorney
Witnesses

UNITED STATES PATENT OFFICE.

JACOB J. SCHUPP, OTTO C. SCHUPP, AND OSCAR H. WISLER, OF GALION, OHIO.

DETACHABLE EMERGENCY TRACTION-SHOE FOR AUTOMOBILES.

1,295,802. Specification of Letters Patent. Patented Feb. 25, 1919.

Application filed November 23, 1915. Serial No. 63,055.

*To all whom it may concern:*

Be it known that we, JACOB J. SCHUPP, OTTO C. SCHUPP, and OSCAR H. WISLER, citizens of the United States, residing at Galion, in the county of Crawford and State of Ohio, have invented new and useful Improvements in Detachable Emergency Traction-Shoes for Automobiles, of which the following is a specification.

This invention relates to improvements in detachable emergency traction shoes for automobiles and other vehicle tires, the object of the invention being to provide a traction shoe of this character which may be readily applied to and removed from a vehicle and which when used will prevent an automobile from being stalled in a muddy road or from skidding on a slippery road surface.

The invention consists in the construction, combination, and arrangement of devices, hereinafter described and claimed.

In the accompanying drawings:—

Figure 1 is a side elevation of a portion of an automobile wheel provided with a shoe constructed in accordance with our invention.

Fig. 2 is an end elevation of the shoe arranged on an automobile wheel, the felly and tire of the latter being indicated in section.

Figs. 3 and 4 are detail views of one of the clamps.

Our improved tire shoe 1 is segmental in form, adapted to be placed and fitted on an automobile wheel tire and in practice, is preferably made of sheet metal and has its side edges rounded as at 2 and its end edges rounded as at 3 to prevent it from cutting or injuring the tire. The shoe is provided on its outer side with traction lugs 4 which are arranged in staggered relation and are relatively broad and are provided with straight outer edges as shown.

To secure the shoe detachably on the tire, the shoe is provided with a suitable number of clamps, three of said clamps being here shown, one at each end and one at the center of the shoe.

Each clamp comprises a bar 6, a yoke 7, a locking lever 8 and a link 9. Each bar is secured transversely on the outer side of the shoe either at one end or at an intermediate portion of the shoe and each bar is provided at one end with an arm 10 and at the opposite end with a hook 11. The yoke 7 is loosely pivotally connected at one end to the arm 10 as at 12. The locking lever 8 is similarly pivotally connected to the other end of the yoke as at 13. The link has one end pivotally connected to the locking lever as at 14, the link being adapted for engagement at the other end with the hook 11 and the locking lever when turned toward the yoke serving to draw the link tightly on the hook and hence cause the yoke to compress the tire of the wheel between it and the shoe, the yokes and locking levers of the clamps passing transversely through the wheel between the spokes thereof. The locking lever is longitudinally curved to conform to the shape of the yoke and its free end is detachably secured to the yoke by means of a hasp 15 which is loosely pivotally connected at one end to one side of the yoke as at 16, has an offset 17 to receive the locking lever, and is detachably engaged with a hook arm 18 with which the yoke is provided.

In practice the clamps, or the yoke members thereof will preferably be lined or covered with cushioning material to prevent scratching or marring of the rim of the wheel. Owing to the provision of the locking lever and the hasp of each clamp, there is no danger of dirt working under the clamps and releasing the same. The clamps are resilient and will yield with the tire as is necessary.

While we have herein shown and described a preferred form of our invention, we would have it understood that changes may be made in the form, proportion, and construction of the several parts without departing from the spirit of the invention and within the scope of the appended claim.

Having described the invention, what is claimed is:

The herein described clamp comprising a bar element, a longitudinally curved yoke permanently pivotally connected at one end to one end of the bar element, a longitudinally curved locking lever pivotally connected to the opposite end of the yoke and adapted for arrangement in over-lapping relation to the yoke with the concave face of said lever presented to the convex face of the yoke, a link detachably connected at one end to the other end of the bar element and also permanently pivotally connected to the locking lever at a point spaced from the pivotally connected end of the locking lever so that when the locking lever is closed against the yoke the link is under maximum tension, an apertured ear formed on one edge of said bar member, a hook formed on the opposite edge of said bar member in transverse alinement with said ear, and a latch bar pivotally connected at one end with said ear and engageable beneath said hook, said latch bar being provided adjacent its pivoted end with an offset portion embracingly engaging said locking lever.

In testimony whereof we affix our signatures in presence of two witnesses.

JACOB J. SCHUPP.
OTTO C. SCHUPP.
OSCAR H. WISLER.

Witnesses:
C. H. NIBLEY,
ANNA BOLLERER.